(12) United States Patent
Hidekura et al.

(10) Patent No.: US 11,788,543 B2
(45) Date of Patent: Oct. 17, 2023

(54) IMPELLER, PUMP HAVING THE IMPELLER, AND METHOD OF PRODUCING THE IMPELLER

(71) Applicant: Ebara Corporation, Tokyo (JP)

(72) Inventors: Miwa Hidekura, Tokyo (JP); Ryoken Yomogida, Tokyo (JP)

(73) Assignee: Ebara Corporation, Tokyo (JP)

( * ) Notice: Subject to any disclaimer, the term of this patent is extended or adjusted under 35 U.S.C. 154(b) by 105 days.

(21) Appl. No.: 17/287,351

(22) PCT Filed: Nov. 14, 2019

(86) PCT No.: PCT/JP2019/044726
§ 371 (c)(1),
(2) Date: Apr. 21, 2021

(87) PCT Pub. No.: WO2020/100986
PCT Pub. Date: May 22, 2020

(65) Prior Publication Data
US 2021/0381521 A1 Dec. 9, 2021

(51) Int. Cl.
*F04D 29/24* (2006.01)
*B23P 15/04* (2006.01)
*F04D 1/00* (2006.01)

(52) U.S. Cl.
CPC .............. *F04D 29/24* (2013.01); *B23P 15/04* (2013.01); *F04D 1/00* (2013.01)

(58) Field of Classification Search
CPC .... F04D 29/24; F04D 29/242; F04D 29/2222; F04D 1/00; B23P 15/04; F05D 2230/232; F05D 2300/10
See application file for complete search history.

(56) References Cited

U.S. PATENT DOCUMENTS 3,144,204 A * 8/1964 Bohanon ............... F04D 29/282
416/220 A
3,225,422 A * 12/1965 Sebok .................. B21D 53/267
29/889.4
(Continued)

FOREIGN PATENT DOCUMENTS

CN      102152008 A      8/2011
CN      104259793 A   *  1/2015   .............. B23P 15/04
(Continued)

OTHER PUBLICATIONS

CN_104259793_A_I English Machine Translation (Year: 2015).*
(Continued)

*Primary Examiner* — J. Todd Newton
*Assistant Examiner* — Wayne A Lambert
(74) *Attorney, Agent, or Firm* — Leydig, Voit & Mayer, Ltd.

(57) ABSTRACT

The impeller (1) includes a main plate (3) formed from a metal plate; and vanes (5) each formed from a metal plate. Each of the vanes (5) has a three-dimensional portion (5A) having a surface inclined with respect to a rotation axis (CA) of the impeller (1) and a two-dimensional portion (5B) having a surface parallel to the rotation axis (CA) of the impeller (1), and the two-dimensional portion (5B) is fixed to the main plate (3) by a first weld (10) formed by projection welding.

5 Claims, 7 Drawing Sheets

(56) References Cited

U.S. PATENT DOCUMENTS

| | | | | |
|---|---|---|---|---|
| 4,986,736 | A * | 1/1991 | Kajiwara | F04D 29/2227 416/182 |
| 6,338,610 | B1 * | 1/2002 | Harada | F04D 29/24 416/186 R |
| 10,001,144 | B2 * | 6/2018 | Shen | F04D 29/626 |
| 10,823,187 | B2 * | 11/2020 | Rausch | F04D 29/2222 |
| 2007/0147999 | A1 * | 6/2007 | Feher | F04D 29/284 416/186 R |
| 2013/0164136 | A1 | 6/2013 | Vestergaard | |
| 2017/0268526 | A1 * | 9/2017 | Seok | F04D 29/242 |

FOREIGN PATENT DOCUMENTS

| | | | |
|---|---|---|---|
| CN | 109079362 B | * | 11/2020 |
| JP | S52-033102 A | | 3/1977 |
| JP | S56-106098 A | | 8/1981 |
| JP | S58-133498 A | | 8/1983 |
| JP | S59-168297 A | | 9/1984 |
| JP | H02-277997 A | | 11/1990 |
| JP | H05-089893 U | | 12/1993 |
| JP | H08-303389 A | | 11/1996 |
| JP | 2005-537420 A | | 12/2005 |
| JP | 2008-286058 A | | 11/2008 |
| TW | M242577 U | | 9/2004 |
| WO | WO 2004/020836 A2 | | 3/2004 |

OTHER PUBLICATIONS

Japan Patent Office, International Search Report in International Application No. PCT/JP2019/044726 (dated Feb. 4, 2020).
China National Intellectual Property Adminstration, Office Action in Chinese Patent Application No. 201980074221.4 (dated Jul. 1, 2022).
European Patent Office, Communication Pursuant to Rules 70(2) and 70a(2) EPC in European Patent Application No. 19885247.7 (dated Aug. 2, 2022).

* cited by examiner

//IMPELLER, PUMP HAVING THE IMPELLER, AND METHOD OF PRODUCING THE IMPELLER

CROSS-REFERENCE TO RELATED APPLICATIONS

This patent application is the U.S. national phase of International Application No. PCT/JP2019/044726, filed Nov. 14, 2019, which claims the benefit of Japanese Patent Application No. 2018-214638, filed on Nov. 15, 2018, which are incorporated by reference in their entireties herein.

TECHNICAL FIELD

The present invention relates to an impeller used in a pump, particularly to an impeller having three-dimensionally shaped vanes each twisted along a direction of flow of a fluid. Furthermore, the present invention relates to a pump having such an impeller. Furthermore, the present invention relates to a method of manufacturing such an impeller.

BACKGROUND ART

A pump, which is a fluid machine, includes an impeller for imparting kinetic energy to a fluid. The impeller generally has a main plate (also referred to as a back shroud) fixed to a rotation shaft and a plurality of vanes fixed to the main plate. The vanes are evenly spaced around the central axis of the impeller, forming a fluid flow path between two adjacent vanes. When the impeller rotates, the fluid flows into the impeller from a fluid inlet of the impeller, flows through the flow path between the vanes, and flows out from an outer circumference of the impeller.

According to a fluid flow analysis, it is known that a vane having a three-dimensional shape twisted along the fluid flow direction enables an impeller to achieve an ideal performance (for example, see patent documents 1 and 2). An impeller with three-dimensional vanes is manufactured by resin molding, casting, or the like. On the other hand, pressed-metal plates may be used to manufacture an impeller having three-dimensionally shaped vanes. In this case, each vane having a three-dimensional shape is fixed to a main plate by welding.

CITATION LIST

Patent Literature

Patent document 1: Japanese laid-open utility model publication No. 05-89893
Patent document 2: U.S. Patent application publication No. US 2013/0164136
Patent document 3: Japanese laid-open patent publication No. 52-33102
Patent document 4: Japanese laid-open patent publication No. 2005-537420

SUMMARY OF INVENTION

Technical Problem

However, since the three-dimensional vane is inclined with respect to the normal direction of the main plate, spot welding cannot be adopted to fix the vane to the main plate. Specifically, when the main plate is pressed against a three-dimensional vane, the vane may fall or bend. In order to avoid such a problem, laser welding may be used to fix the three-dimensional vane to the main plate. The laser welding allows the vane to be joined to the main plate without pressing the main plate strongly against the vane. However, the laser welding requires a more welding time and more costs than those of the spot welding. As a result, the mass productivity of impellers cannot be increased, and the manufacturing time and manufacturing costs of the entire impellers increase.

Therefore, the present invention provides a low-cost impeller having a three-dimensionally shaped vane constituted by a pressed metal plate. The present invention also provides a pump having such an impeller. Furthermore, the present invention provides a method of producing the impeller having a three-dimensionally shaped vane constituted by a pressed metal plate.

Solution to Problem

In one embodiment, there is provided an impeller to be used for a pump, comprising: a main plate formed from a metal plate; and vanes each formed from a metal plate, wherein each of the vanes has a three-dimensional portion having a surface inclined with respect to a rotation axis of the impeller and a two-dimensional portion having a surface parallel to the rotation axis of the impeller, and the two-dimensional portion is fixed to the main plate by a first weld formed by projection welding.

In one embodiment, the impeller further comprises a side plate formed from a metal plate, the side plate having a fluid inlet, the two-dimensional portion being fixed to the side plate by a second weld formed by projection welding.

In one embodiment, a length of the two-dimensional portion along a longitudinal direction of the vane is larger than a length of the three-dimensional portion along the longitudinal direction of the vane.

In one embodiment, there is provided a pump comprising: the impeller; a rotation shaft to which the impeller is fixed; and a casing accommodating the impeller.

In one embodiment, there is provided a method of producing an impeller to be used for a pump, comprising: producing a main plate and vanes from metal plates, each of the vanes including a three-dimensional portion having a surface inclined with respect to a rotation axis of the impeller and a two-dimensional portion having a surface parallel to the rotation axis of the impeller; and joining the two-dimensional portion to the main plate by projection welding.

In one embodiment, the method further comprises: producing a side plate from a metal plate, the side plate having a fluid inlet; and joining the two-dimensional portion to the side plate by projection welding.

In one embodiment, joining of the two-dimensional portion to the main plate by the projection welding and joining of the two-dimensional portion to the side plate by the projection welding are performed simultaneously.

In one embodiment, the method further comprises joining a part of the three-dimensional portion to the main plate by laser spot welding.

Advantageous Effects of Invention

The two-dimensional portion is parallel to the central axis of the impeller. Therefore, when the main plate is pressed against the vane during the projection welding, the vane does not tilt and the vane does not bend. The projection welding is cheaper than the laser welding, and the area where the projection welding is performed is extremely smaller than the area where the laser welding is performed. As a result, the impeller can be manufactured at low costs in a short time, and the mass productivity can be improved.

DESCRIPTION OF EMBODIMENTS

Hereinafter, embodiments of the present invention will be described with reference to the drawings.

Figure 1:
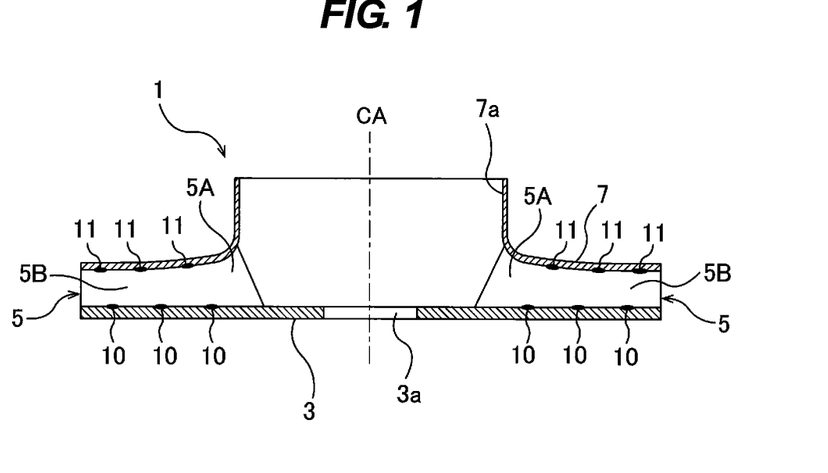
FIG. 1 is a cross-sectional view showing an embodiment of an impeller.

FIG. 1 is a cross-sectional view showing an embodiment of an impeller. An impeller 1 shown in FIG. 1 is a centrifugal impeller used for a pump for pumping a liquid. The impeller 1 includes a main plate 3 having a through-hole 3*a* into which a rotation shaft of a pump is inserted, vanes 5 fixed to the main plate 3, and a side plate 7 having a fluid inlet 7*a*. The side plate 7 may be called a front shroud, and the main plate 3 may be called a back shroud.

The vanes 5 are arranged at equal intervals around the through-hole 3*a* and extend radially. These vanes 5 are arranged between the main plate 3 and the side plate 7. The main plate 3, the side plate 7, and the vanes 5 are all formed from metal plates. An example of the metal plate is a metal plate made of stainless steel. Each vane 5 is constituted by a pressed metal plate. Each of the main plate 3 and the side plate 7 is also constituted by a pressed metal plate.

Figure 2:
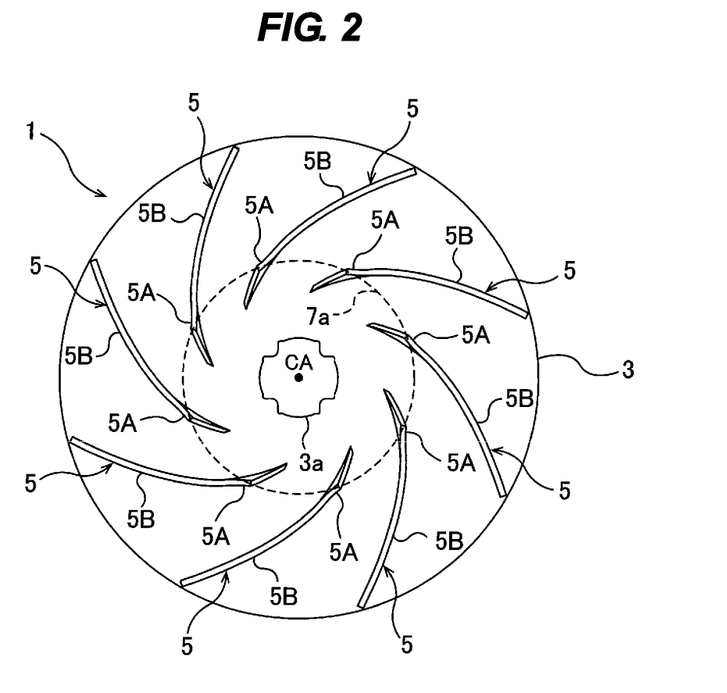
FIG. 2 is a top view of the impeller shown in FIG. 1 as viewed from a suction side.

FIG. 2 is a top view of the impeller 1 shown in FIG. 1 as viewed from the suction side. For the purpose of explaining the structure of the impeller 1, the side plate 7 is not depicted in FIG. 2. Each of the vanes 5 has a shape twisted along a longitudinal direction of each vane 5. More specifically, each vane 5 has a three-dimensional portion 5A having a surface inclined with respect to a rotation axis CA of the impeller 1 and a two-dimensional portion 5B having a surface parallel to the rotation axis CA of the impeller 1. The three-dimensional portion 5A is smoothly connected to the two-dimensional portion 5B. The three-dimensional portion 5A is a portion twisted along the longitudinal direction of the vane 5 (i.e., along the flow direction of the liquid). The two-dimensional portion 5B is connected to the three-dimensional portion 5A, but does not have a shape twisted along the longitudinal direction of the vane 5.

In the present embodiment, the three-dimensional portion 5A is located inwardly of the two-dimensional portion 5B in the radial direction of the impeller 1. A length of the two-dimensional portion 5B along the longitudinal direction of the vane 5 is larger than a length of the three-dimensional portion 5A along the longitudinal direction of the vane 5. The three-dimensional portion 5A and the two-dimensional portion 5B are an integral structure, and are constituted by a single metal plate. The vane 5 having such three-dimensional portion 5A and two-dimensional portion 5B can be produced by a pressing process of a metal plate.

Each vane 5 is fixed to the main plate 3 by first welds 10 formed by projection welding. As shown in FIG. 1, there are first welds 10 between each vane 5 and the main plate 3. In this embodiment, each vane 5 and the main plate 3 are fixed to each other by three first welds 10, but the number of first welds 10 is not limited to the present embodiment. The first welds 10 are present on a contact portion of the two-dimensional portion 5B and the main plate 3 (i.e., on one edge of the two-dimensional portion 5B), and are not present on a contact portion of the three-dimensional portion 5A and the main plate 3.

Similarly, each vane 5 is fixed to the side plate 7 by second welds 11 formed by projection welding. As shown in FIG. 1, there are second welds 11 between each vane 5 and the side plate 7. In this embodiment, each vane 5 and the side plate 7 are fixed to each other by three second welds 11, but the number of second welds 11 is not limited to the present embodiment. The second welds 11 are present on a contact portion of the two-dimensional portion 5B and the side plate 7 (i.e., on the other edge of the two-dimensional portion 5B), and is not present on a contact portion of the three-dimensional portion 5A and the side plate 7.

Figure 3:
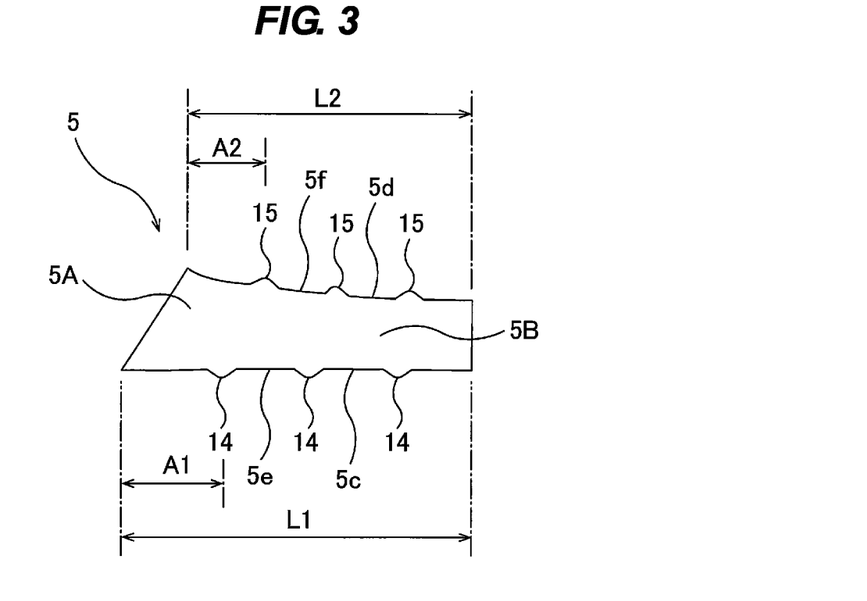
FIG. 3 is a side view showing a vane before subjected to projection welding.

FIG. 3 is a side view showing the vane 5 before subjected to the projection welding. As shown in FIG. 3, protrusions 14 (three protrusions 14 in this embodiment) are formed on one edge 5*c* of the two-dimensional portion 5B of the vane 5 to be joined to the main plate 3. Multiple protrusions 15 (three protrusions 15 in this embodiment) are formed on the other edge 5*d* of the two-dimensional portion 5B of the vane 5 to be joined to the side plate 7. When the main plate 3 and the vane 5 are joined by the projection welding, the main plate 3 is pressed against the vane 5, with the protrusions 14 in contact with the main plate 3. Then, an electric current is passed to the protrusions 14 to dissolve the protrusions 14, so that the main plate 3 and the vane 5 are fixed to each other by solidified metal material. The solidified metal material forms the first welds 10 (see FIG. 1) existing between the main plate 3 and the vane 5.

When the side plate 7 and the vane 5 are joined by the projection welding, the side plate 7 is pressed against the vane 5, with the protrusions 15 in contact with the side plate 7. Then, an electric current is passed to the protrusions 15 to dissolve the protrusions 15, so that the side plate 7 and the vanes 5 are fixed to each other by solidified metal material. The solidified metal material forms the second welds 11 (see FIG. 1) existing between the side plate 7 and the vane 5.

The two-dimensional portion 5B is parallel to the central axis CA of the impeller 1, i.e., parallel to the normal direction of the main plate 3 and the normal direction of the side plate 7. Therefore, when the main plate 3 and the side plate 7 are pressed against the vane 5 during the projection welding, the vane 5 does not tilt and the vane 5 does not bend. The projection welding is cheaper than the laser welding, and an area where the projection welding is performed is extremely smaller than an area where the laser welding is performed. As a result, the impeller 1 can be manufactured at a low cost in a short time, and mass productivity can be improved.

As shown in FIG. 3, where a total length of the edge 5e of the vane 5, connected to the main plate 3, is L1, and a distance from an inner end of the edge 5e to the innermost protrusion 14 (i.e., a distance from the inner end of the edge 5e to the innermost first weld 10) is A1, a ratio of A1 to L1 is 25% or less. Similarly, where a total length of the edge 5f of the vane 5, connected to the side plate 7, is L2, and a distance from an inner end of the edge 5f to the innermost protrusion 15 (i.e., a distance from the inner end of the edge 5f to the innermost second weld 11) is A2, a ratio of A2 to L2 is 25% or less.

In the present embodiment, the three-dimensional portion 5A is not fixed to the main plate 3 and the side plate 7, but the ratio of A1 to L1 and the ratio of A2 to L2 are 25% or less. Therefore, the entire vane 5 is firmly held on the main plate 3 and the side plate 7 by the first welds 10 of the two-dimensional portion 5B and the main plate 3 and the second welds 11 of the two-dimensional portion 5B and the side plate 7.

Figure 4:
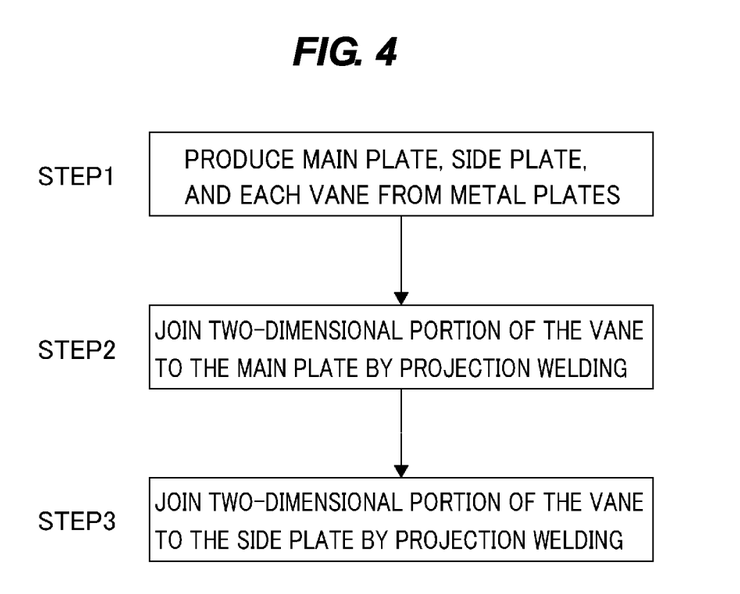
FIG. 4 is a flowchart showing a method of producing the impeller shown in FIG. 1.

FIG. 4 is a flowchart showing a method of producing the impeller 1 shown in FIG. 1. In step 1, the main plate 3, the side plate 7, and the vanes 5 shown in FIG. 3 are each produced from a metal plate. The order in which the main plate 3, the side plate 7, and the vanes 5 are produced is not particularly limited. For example, the main plate 3, the side plate 7, and the vanes 5 may be produced in this order, or the main plate 3, the side plate 7, and the vanes 5 may be produced at the same time.

The entirety of the main plate 3 is circular and has the through-hole 3a in the center thereof. In order to form the main plate 3 having such a shape, in the present embodiment, the main plate 3 is produced from a metal plate by the pressing process (or stamping). However, the shape of the main plate 3 is not limited to a circular shape, and the main plate 3 may have another shape, such as a star shape, as long as it has an area necessary for welding the vanes 5. The entirety of the side plate 7 is circular and has the fluid inlet 7a at the center thereof. However, the shape of the side plate 7 is not limited to a circular shape, and the side plate 7 may have another shape, such as a star shape, as long as it has an area necessary for welding the vanes 5. As can be seen from FIG. 1, the side plate 7 is inclined from its outer periphery toward the fluid inlet 7a. In order to form the side plate 7 having such a shape, in the present embodiment, the side plate 7 is produced from a metal plate by the pressing process (or stamping). Since each vane 5 has a complicated shape having the two-dimensional portion 5B and the three-dimensional portion 5A, each vane 5 is produced from a metal plate by the pressing process (or stamping).

In step 2, the two-dimensional portions 5B of the vanes 5 are joined to the main plate 3 by the projection welding, and in step 3, the two-dimensional portions 5B of the vanes 5 are joined to the side plate 7 by the projection welding. In one embodiment, as step 2, the two-dimensional portions 5B of the vanes 5 may be joined to the side plate 7 by the projection welding, and as step 3, the two-dimensional portions 5B of the vanes 5 may be joined to the main plate 3 by the projection welding. Further, in one embodiment, in order to shorten the manufacturing process of the impeller 1, the two-dimensional portions 5B of the vanes 5 may be joined to the side plate 7 and the main plate 3 at the same time by the projection welding.

Figure 5:
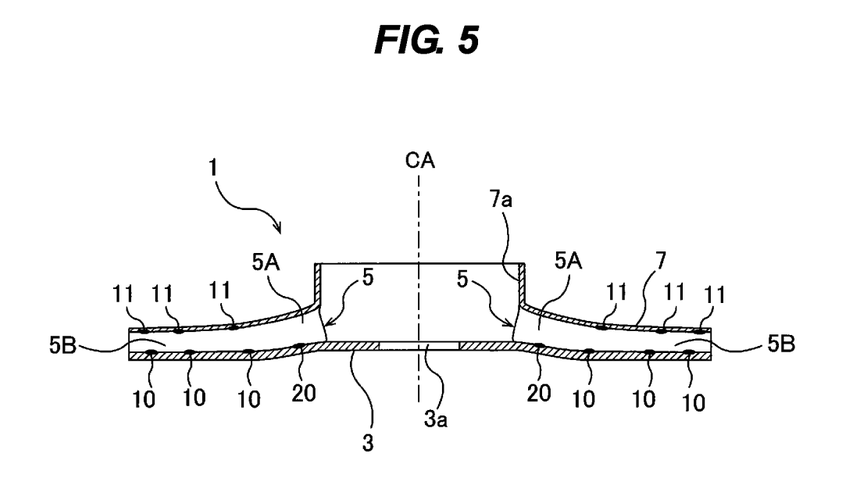
FIG. 5 is a cross-sectional view showing another embodiment of the impeller.
Figure 6:
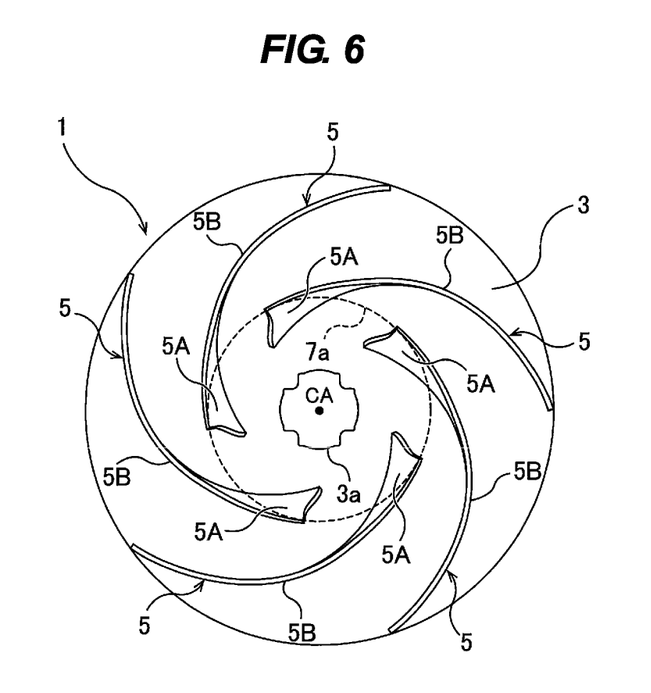
FIG. 6 is a top view of the impeller shown in FIG. 5 as viewed from a suction side.
Figure 7:
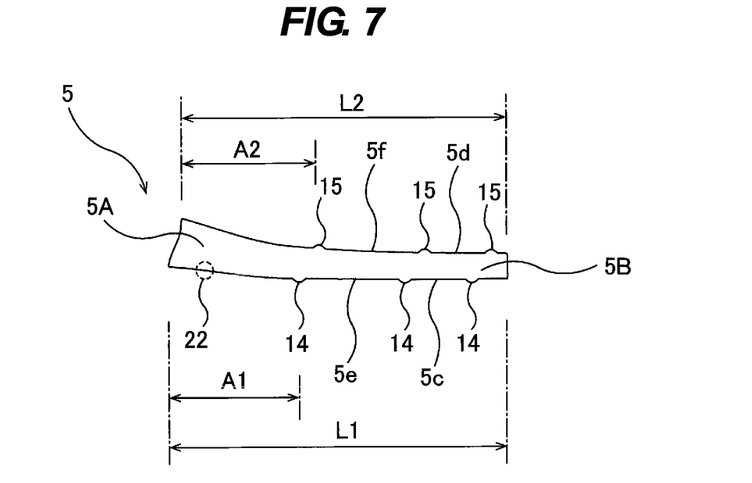
FIG. 7 is a side view showing a vane before subjected to projection welding.

FIG. 5 is a cross-sectional view showing another embodiment of the impeller 1, FIG. 6 is a top view of the impeller 1 shown in FIG. 5 as viewed from the suction side, and FIG. 7 is a side view showing vane 5 before subjected to the projection welding. In FIG. 6, the depiction of side plate 7 is omitted. Configurations of this embodiment, which will not be particularly described, are the same as those of the embodiment described with reference to FIG. 1 to FIG. 3, and repetitive descriptions thereof are omitted.

As shown in FIG. 5, side plate 7 and each vane 5 are fixed to each other by second welds 11 formed by the projection welding, while main plate 3 and each vane 5 are fixed to each other by welds 10 formed by the projection welding and a third weld 20 formed by laser spot welding. The laser spot welding is a technique for irradiating a spot region (a narrow region) with laser light to weld the spot region.

As shown in FIG. 7, in this embodiment, the ratio of A1 to L1 and the ratio of A2 to L2 are greater than 25% and less than or equal to 43%. The length of the three-dimensional portion 5A is smaller than the length of the two-dimensional portion 5B. However, a ratio of the length of the three-dimensional portion 5A to the total length of the vane 5 is large, and therefore it is preferable that the three-dimensional portion 5A be fixed to the main plate 3. Therefore, in the present embodiment, a part of the three-dimensional portion 5A and the main plate 3 are joined by the laser spot welding. More specifically, as shown in FIG. 7, a spot region 22 of the three-dimensional portion 5A located between the inner end of the edge 5e of the vane 5, to be joined to the main plate 3, and the innermost protrusion 14 is welded by the laser welding.

Since the laser welding does not require the main plate 3 to be strongly pressed against the vane 5, the three-dimensional portion 5A can be fixed to the main plate 3 without causing deformation of the three-dimensional portion 5A. Furthermore, since the laser welding of the present embodiment is the laser spot welding, the region to be welded is small, and the cost and time required for welding can be reduced.

Figure 8:
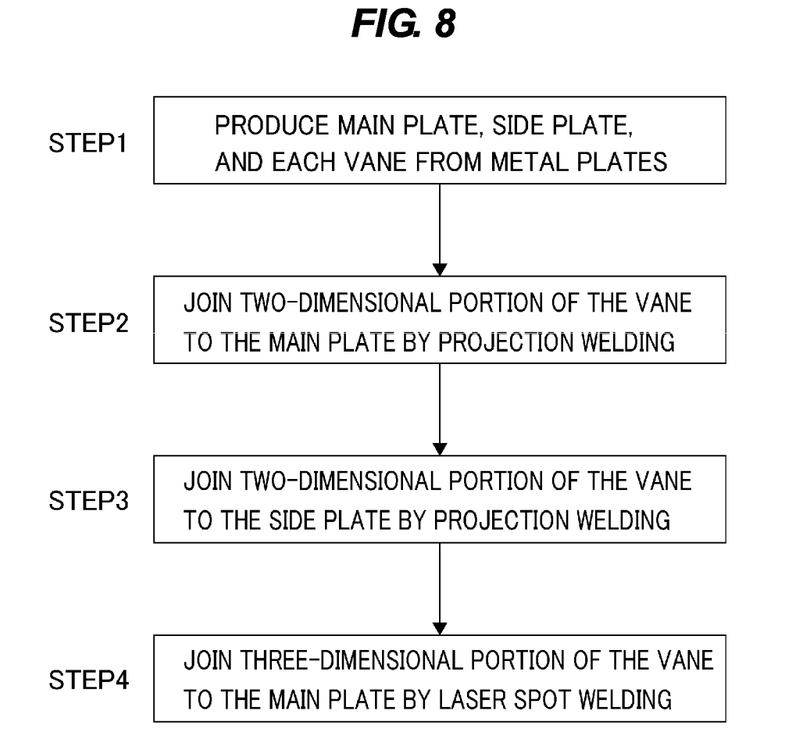
FIG. 8 is a flowchart showing a method of producing the impeller shown in FIG. 5.

FIG. 8 is a flowchart showing a method of producing the impeller 1 shown in FIG. 5. The descriptions of the flowchart with reference to FIG. 4 are applicable to the descriptions of the flowchart shown in FIG. 8. In step 1, the main plate 3, the side plate 7, and the vanes 5 shown in FIG. 7 are each produced from a metal plate by the pressing process (or stamping). In step 2, the two-dimensional portions 5B of the vanes 5 are joined to the main plate 3 by the projection welding, and in step 3, the two-dimensional portions 5B of the vanes 5 are joined to the side plate 7 by the projection welding. In one embodiment, as step 2, the two-dimensional portions 5B of the vanes 5 may be joined to the side plate 7 by the projection welding, and as step 3, the two-dimensional portions 5B of the vanes 5 may be joined to the main plate 3 by the projection welding. Further, in one embodiment, in order to shorten the manufacturing process of the impeller 1, the two-dimensional portions 5B of the vanes 5 may be joined to the side plate 7 and the main plate 3 at the same time by the projection welding.

In step 4, a part of the three-dimensional portion 5A of each vane 5 is joined to the main plate 3 by the laser spot welding. Since the vanes 5 have already been joined to the main plate 3 and the side plate 7 by the projection welding before the laser spot welding is performed, the laser spot welding is performed in a state such that the positioning of the three-dimensional portions 5A of the vanes 5 with respect to the main plate 3 is established.

Figure 9:
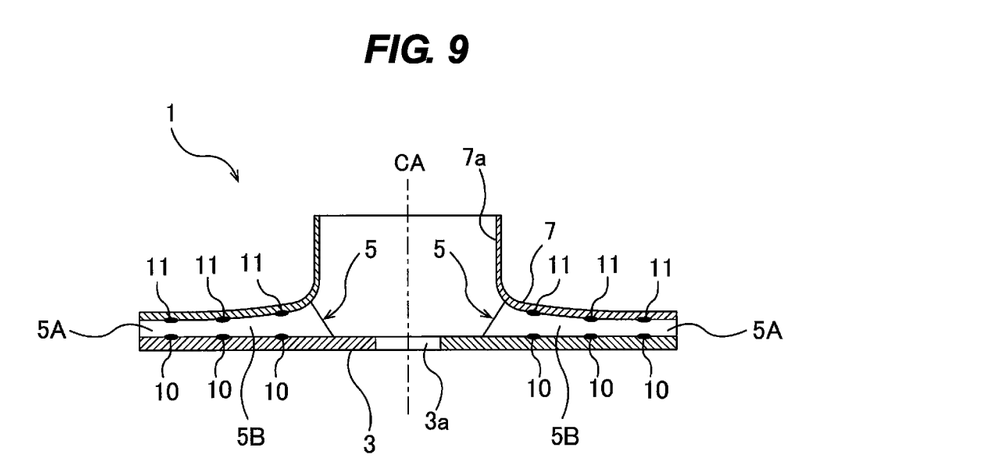
FIG. 9 is a cross-sectional view showing still another embodiment of the impeller.
Figure 10:
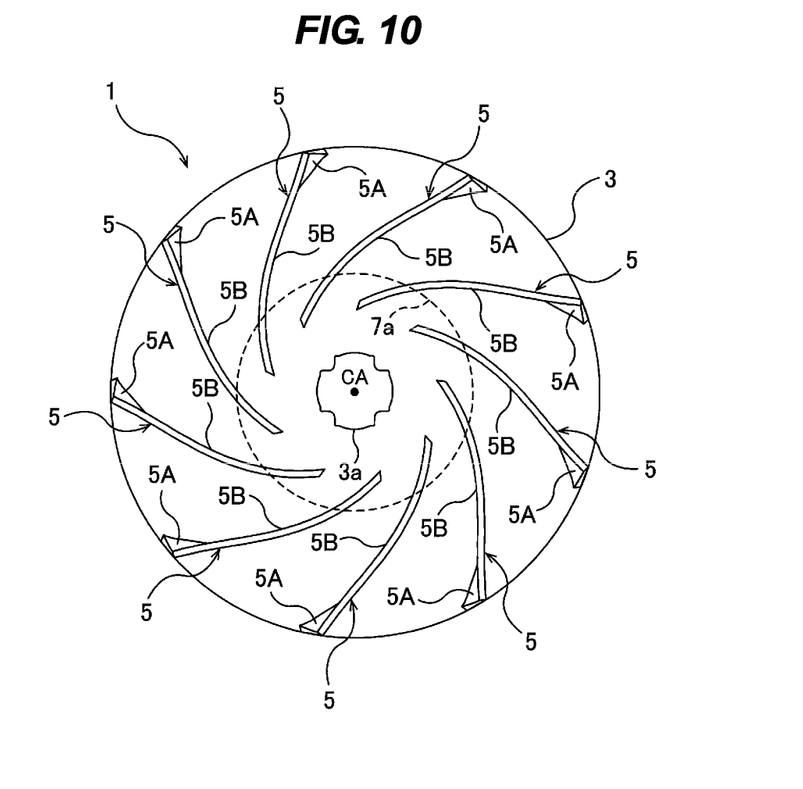
FIG. 10 is a top view of the impeller shown in FIG. 9 as viewed from a suction side.
Figure 11:
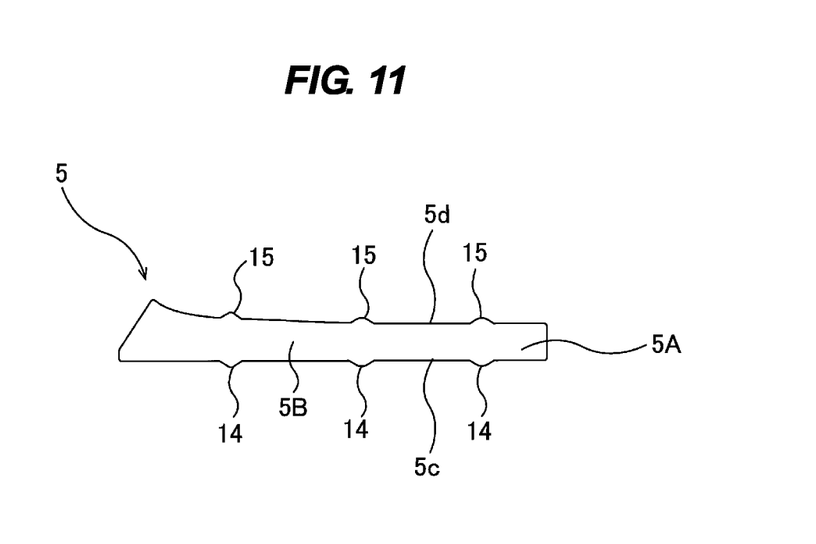
FIG. 11 is a side view showing a vane before subjected to projection welding.

FIG. 9 is a cross-sectional view showing still another embodiment of the impeller 1, FIG. 10 is a top view of the impeller 1 shown in FIG. 9 as viewed from the suction side, and FIG. 11 is a side view showing vane 5 before subjected to the projection welding. In FIG. 10, the depiction of side plate 7 is omitted. Configurations of this embodiment, which will not be particularly described, are the same as those of the embodiment described with reference to FIG. 1 to FIG. 3, and repetitive descriptions thereof are omitted.

In the present embodiment, three-dimensional portion 5A of vane 5 is located outwardly of two-dimensional portion 5B in the radial direction of impeller 1. Also in this embodiment, the projection welding is performed on the two-dimensional portion 5B of the vane 5. In one embodiment, three-dimensional portions 5A of the vane 5 may be provided inwardly and outwardly of the two-dimensional portion 5B in the radial direction of the impeller 1.

The impeller 1 according to each of the above-described embodiments is a so-called closed-type impeller having both the main plate 3 and the side plate 7. However, it is noted that the present invention can be applied to a so-called semi-open type impeller having a main plate and no side plate.

Figure 12:
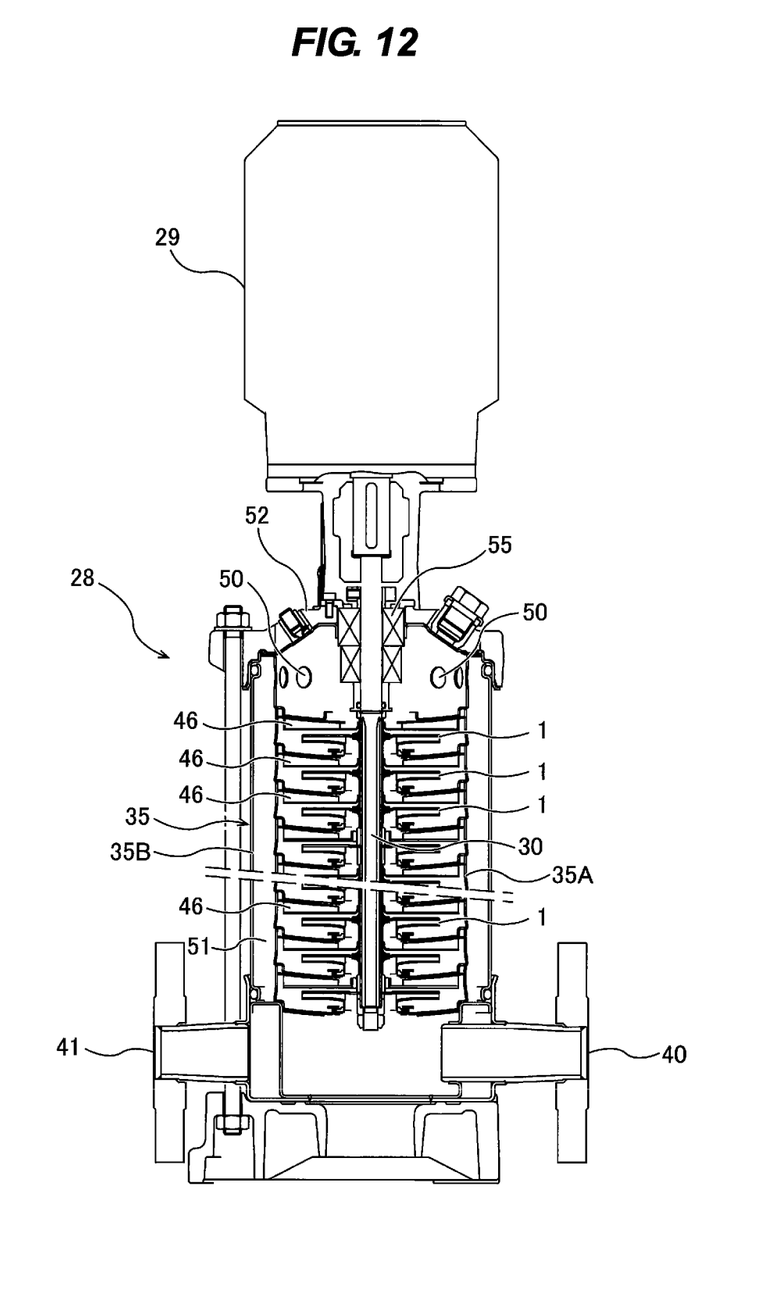
FIG. 12 is a cross-sectional view showing a pump apparatus having the impeller according to the above embodiment.

FIG. 12 is a cross-sectional view showing a pump apparatus including the impeller according to the above embodiments. The pump apparatus shown in FIG. 12 includes a pump 28 and an electric motor 29 for driving the pump 28. The pump 28 includes a rotation shaft 30, multiple impellers 1 fixed to the rotation shaft 30, and a casing 35 in which the impellers 1 are housed. Each impeller 1 is the impeller according to any one of the above-described embodiments. The rotation shaft 30 is coupled to the electric motor 29. When the rotation shaft 30 is rotated by the electric motor 29, the impellers 1 are rotated together with the rotation shaft 30.

The casing 35 includes an inner casing 35A and an outer casing 35B. The inner casing 35A is arranged inside the outer casing 35B, and an outer surface of the inner casing 35A is covered by the outer casing 35B. A suction-side opening of the inner casing 35A is coupled to a suction port 40, and a discharge-side opening of the outer casing 35B is coupled to a discharge port 41. Return vanes 46 are arranged at back sides of the impellers 1, respectively.

As the impellers 1 rotate, a liquid is sucked into the impeller 1 through the suction port 40. The liquid flowing out from the outer circumference of the impeller 1 is guided to the next-stage impeller 1 by the return vanes 46. The liquid that has flowed out of the final-stage impeller 1 flows into the outer casing 35B through communication holes 50 formed in the end of the inner casing 35A. The liquid passes through a flow path 51 formed between the inner surface of the outer casing 35B and the outer surface of the inner casing 35A toward the discharge port 41, and is discharged to the outside of the pump apparatus through the discharge port 41.

A discharge-side opening end of the casing 35 is closed by a casing cover 52. A mechanical seal 55 is fixed to the casing cover 52. The mechanical seal 55 is a shaft seal that seals a gap between the casing cover 52 and the rotation shaft 30. A leakage of the liquid pressurized by the rotation of the impellers 1 is prevented by the mechanical seal 55.

In the present embodiment, each of the impellers 1, the inner casing 35A, and the outer casing 35B is an assembly of pressed metal plates. More specifically, parts of the impeller 1, the inner casing 35A, and the outer casing 35B are formed by pressing metal plates, and these parts are assembled to constitute the impeller 1, the inner casing 35A, and the outer casing 35B. Material of the metal plates may be a corrosion-resistant metal, such as stainless steel. The pump 28 according to the present embodiment is a multi-stage pump including the multiple impellers 1. In one embodiment, the pump 28 may be a single-stage pump including one impeller 1.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments. Therefore, the present invention is not intended to be limited to the embodiments described herein but is to be accorded the widest scope as defined by limitation of the claims.

INDUSTRIAL APPLICABILITY

The present invention is applicable to an impeller having three-dimensionally shaped vanes each twisted along a direction of fluid flow.

REFERENCE SIGNS LIST 1 impeller
3 main plate
5 vane
5A three-dimensional portion
5B two-dimensional portion
7 side plate
10 first weld
11 second weld
14 protrusion
15 protrusion
20 third weld
22 spot region
28 pump
29 electric motor
30 rotation shaft
35 casing
35A inner casing
35B outer casing
40 suction port
41 discharge port
46 return vane
50 communication hole
51 flow path
52 casing cover
55 mechanical seal

The invention claimed is:

1. An impeller to be used for a pump, comprising:
a main plate formed from a metal plate; and
a side plate formed from a metal plate; and
vanes each formed from a metal plate, each vane having
  a first edge connected to the main plate and a second edge connected to the side plate,
wherein each of the vanes has a three-dimensional portion having a surface inclined with respect to a rotation axis of the impeller and a two-dimensional portion having a surface parallel to the rotation axis of the impeller,
the two-dimensional portion is fixed to the main plate by first welds formed by projection welding,
the two-dimensional portion is fixed to the side plate by second welds formed by projection welding,
a ratio of A1 to L1 and a ratio of A2 to L2 are greater than 25% and less than or equal to 43%, where A1 represents a distance from an inner end of the first edge to an innermost one of the first welds, L1 represents a total length of the first edge, A2 represents a distance from an inner end of the second edge to an innermost one of the second welds, and L2 represents a total length of the second edge, a spot region of the three-dimensional portion is fixed to the main plate by a third weld formed by laser welding, and the spot region is located between the inner end of the first edge and the innermost one of the first welds.

2. The impeller according to claim 1, wherein a length of the two-dimensional portion along a longitudinal direction of the vane is larger than a length of the three-dimensional portion along the longitudinal direction of the vane.

3. A pump comprising:
the impeller according to claim 1;
a rotation shaft to which the impeller is fixed; and
a casing accommodating the impeller.

4. The impeller according to claim 1, wherein the three-dimensional portion is located inwardly of the two-dimensional portion in a radial direction of each vane.

5. The impeller according to claim 1, wherein the third weld is a weld formed by laser spot welding.

\* \* \* \* \*